United States Patent
Filippi et al.

(10) Patent No.: US 7,055,583 B2
(45) Date of Patent: Jun. 6, 2006

(54) HEAT EXCHANGE UNIT FOR ISOTHERMAL CHEMICAL REACTORS

(75) Inventors: Ermanno Filippi, Castagnola (CH); Enrico Rizzi, Grandate (IT); Mirco Tarozzo, Ligornetto (CH)

(73) Assignee: Methanol Casale S.A. (CH)

( * ) Notice: Subject to any disclaimer, the term of this patent is extended or adjusted under 35 U.S.C. 154(b) by 0 days.

(21) Appl. No.: 10/493,035

(22) PCT Filed: Oct. 2, 2002

(86) PCT No.: PCT/EP02/11024

§ 371 (c)(1),
(2), (4) Date: Apr. 19, 2004

(87) PCT Pub. No.: WO03/035241

PCT Pub. Date: May 1, 2003

(65) Prior Publication Data

US 2005/0061490 A1    Mar. 24, 2005

(30) Foreign Application Priority Data

Oct. 19, 2001    (EP) ................................. 01124956

(51) Int. Cl.
F28F 9/22    (2006.01)

(52) U.S. Cl. .................. 165/145; 165/157; 165/170
(58) Field of Classification Search ............... 165/145, 165/157, 170

See application file for complete search history.

(56) References Cited

U.S. PATENT DOCUMENTS

| 1,958,899 | A | * | 5/1934 | MacAdams | ................. 165/170 |
| 3,406,747 | A | * | 10/1968 | White | ........................ 165/74 |
| 3,595,308 | A | | 7/1971 | Durdin | |
| 3,796,547 | A | | 3/1974 | Muenger | |
| 4,305,456 | A | * | 12/1981 | Mueller et al. | ............. 165/145 |
| 4,311,671 | A | | 1/1982 | Notman | |
| 5,035,867 | A | | 7/1991 | Dang Vu et al. | |
| 5,205,348 | A | * | 4/1993 | Tousignant et al. | ......... 165/170 |
| 6,196,296 | B1 | * | 3/2001 | Wisniewski et al. | .......... 165/47 |
| 6,460,614 | B1 | * | 10/2002 | Hamert et al. | .............. 165/170 |

* cited by examiner

Primary Examiner—Teresa J. Walberg
(74) Attorney, Agent, or Firm—Akerman Senterfitt

(57) ABSTRACT

A heat exchange unit for isothermal radial or axial-radial chemical reactors (1), with an overall configuration which is substantially annular and cylindrical having a passage (11) with a predetermined diameter running through it axially, is distinguished in that it comprises a plurality of substantially rectangular, flattened box-shaped heat exchangers (13), distributed in many coaxial and concentric arrays, defining in the unit (12) a plurality of radial alignments with a substantially radial arrangement, and wherein the exchangers (13) have long sides (13a) parallel to the axis of the unit (12) and short sides (13b) extending radially, each of the exchangers (13) comprising an inner chamber (17), intended to be passed through by an operating heat exchange fluid, at least one distributor pipe (19) and at least one collector pipe (20) of the operating fluid, associated with two respective opposing sides (13a) of the exchanger (13) and extending along them, the pipes (19, 20) being in fluid communication, on the one side, with the chamber (17) through at least one opening (19a, 20a) formed therein and, on the other side, with the outside of the exchanger (13), through respective inlet and outlet fittings (21, 22) for the operating fluid.

22 Claims, 7 Drawing Sheets

HEAT EXCHANGE UNIT FOR ISOTHERMAL CHEMICAL REACTORS

FIELD OF APPLICATION

The present invention relates, in its broader aspect, to a chemical reactor of the type comprising a substantially cylindrical shell (or pressure vessel) closed at its opposite ends by respective bottoms, a reaction zone in said shell wherein at least a catalytic bed is placed, and a heat exchange unit embedded in said catalytic bed.

Such a reactor is particularly useful for carrying out exothermic and endothermic reactions occurring in substantially isothermal conditions, i.e. conditions in which the reaction temperature is controlled in a rather limited range of values around a predetermined value.

In the following description and claims, a reactor of the aforementioned type is referred to as pseudoisothermal or, in short, isothermal reactor.

More in detail, the present invention relates to an isothermal reactor of the type being considered, structured internally to allow the reactant gases and the gaseous reaction products to cross the catalyst bed in a radial or axial-radial direction (with reference to the axis of the cylindrical shell of said reactor) and comprising a heat exchange unit made of a plurality of plate-shaped heat exchangers, which are substantially box-like, defining in their interior a chamber intended to be crossed by a heat exchange operating fluid.

PRIOR ART

Generally speaking, the operating fluid used in the heat exchange unit of an isothermal reactor, can be constituted of a fluid whose temperature changes (a non-boiling fluid), such as for example an appropriate and controlled flow of the reactant gases fed to the reactor itself, or a boiling, i.e. isothermal, fluid, such as boiling water, melted salts, Dow Therm, and alike. Furthermore, in order to make the heat exchange more effective, and hence, of improving the kinetics of the chemical reaction, the flow of said operating fluid is directed, inside the respective heat exchange unit, in countercurrent or in co-current with the gaseous reaction products that, in turn, cross the catalyst bed in a radial or axial-radial direction, with reference to the generally vertical axis of the shell of the reactor considered. When the operating fluid consists of the reactant gases themselves, besides removing or providing heat to the reaction environment (catalytic bed) so as to promote the completion of the reaction itself, they warm up or cool down, respectively, reaching a temperature condition which is thermodynamically favourable for the start of, the reaction.

In this case, (radial or axial-radial flow) the general configuration of an isothermal reactor is that of a pressure vessel, wherein is supported at least one catalytic cartridge, enclosed by two walls which are concentric and coaxial to the vessel itself and which are suitably perforated to allow the gases to pass through the catalyst contained in said cartridge (catalytic bed). In the mass of catalyst is embedded a heat exchange unit, made of a plurality of exchangers, which are appropriately structured, supported and interconnected.

Amongst the most efficient and most recently used exchangers in isothermal reactors of the type considered here, plate exchangers that have a substantially flattened box-like structure are the most popular.

As much as they are advantageous under different points of view, as for example that of the large surface made available for the heat exchange, the plate-shaped heat exchangers of the aforementioned type suffer from a technical drawback consisting of the difficulty in directing the flow of operating fluid in their interior in the designated direction, for example and in particular in the radial direction with respect to the axis of the reactor. This is a difficulty, which often means a reduced heat exchange efficiency and, therefore, a reduced yield of the chemical reaction that is intended to be developed.

SUMMARY OF THE INVENTION

The technical problem underlying the present invention is that of providing a heat exchange unit for radial or axial-radial isothermal reactors, having structural and functional characteristics such as to overcome the drawback quoted above with reference to the prior art.

This problem is solved according to the invention by a heat exchange unit for isothermal radial or axial-radial chemical reactors, with an overall configuration which is substantially annular and cylindrical having a passage with a predetermined diameter running through it axially, characterized in that it comprises a plurality of substantially rectangular, flattened box-shaped heat exchangers, distributed in many coaxial and concentric arrays, defining in said unit a plurality of radial alignments with a substantially radial arrangement, and wherein said exchangers have long sides parallel to the axis of said unit and short sides extending radially each of said exchangers comprising an inner chamber, intended to be passed through by an operating heat exchange fluid, at least one distributor pipe and at least one collector pipe of said operating fluid, associated with two respective opposing sides of said exchanger and extending along them, said pipes being in fluid communication, on the one side, with said chamber through at least one opening formed therein and, on the other side, with the outside of said exchanger, through respective inlet and outlet fittings for said operating fluid.

DETAILED DESCRIPTION

Figure 1:
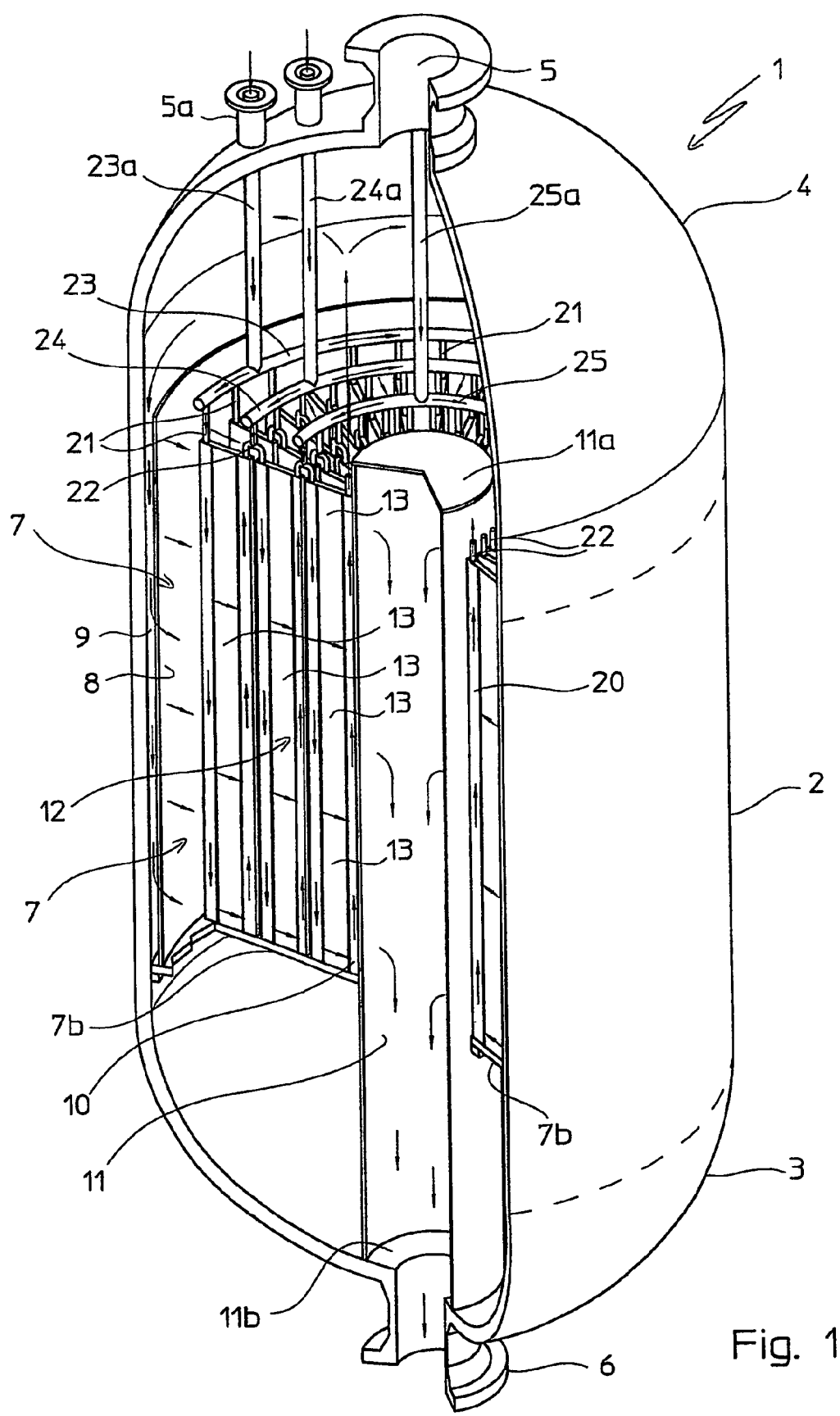
FIG. 1 schematically represents, in a partial section perspective view, a radial isothermal reactor, using a heat exchange unit comprising a plurality of exchangers according to the invention.

With reference to FIG. 1, with 1 is wholly indicated an isothermal reactor comprising a cylindrical shell 2, with a vertical axis, closed at the opposite ends with respective bottoms, lower 3 and upper 4, conventionally equipped with passages 5, 6 for the introduction and the discharge of the reactant gases and of the gaseous reaction products into and from said isothermal reactor 1, respectively, as will become clearer from the rest of the description.

In the shell 2 is defined a reaction zone, in which is conventionally supported a catalytic basket 7, with a substantially cylindrical configuration, having an annular transversal section. Said basket 7 substantially consists of an outer cylindrical wall 8, which, together with said shell 2, defines a space 9 with a reduced width, an inner cylindrical wall 10 and an annular bottom of the conventional type outlined in 7b.

The inner wall 10 centrally defines an axial passage, in which is generally supported a pipe 11, for collecting gaseous reaction products, which has a closed upper end 11a and an open lower end 11b which is in direct fluid communication with the passage 6 of the bottom 3.

Said walls, outer 8 and inner 10, are perforated to allow the passage of the reactant gases from the airspace 9 inside said basket 7, and the passage of the gaseous reaction products from said basket 7, to said central pipe 11.

The basket 7 is intended to contain a mass of a suitable catalyst (not represented), in which is embedded and supported, in a per se known way, a heat exchange unit globally indicated with 12.

Said heat exchange unit 12 has an overall annular cylindrical configuration, similar to that of said basket 7. It has an outer diameter that is substantially equal to the outer diameter of the basket 7 and is axially crossed by a passage having a diameter substantially equal to the inner diameter of the basket itself.

Figure 2:
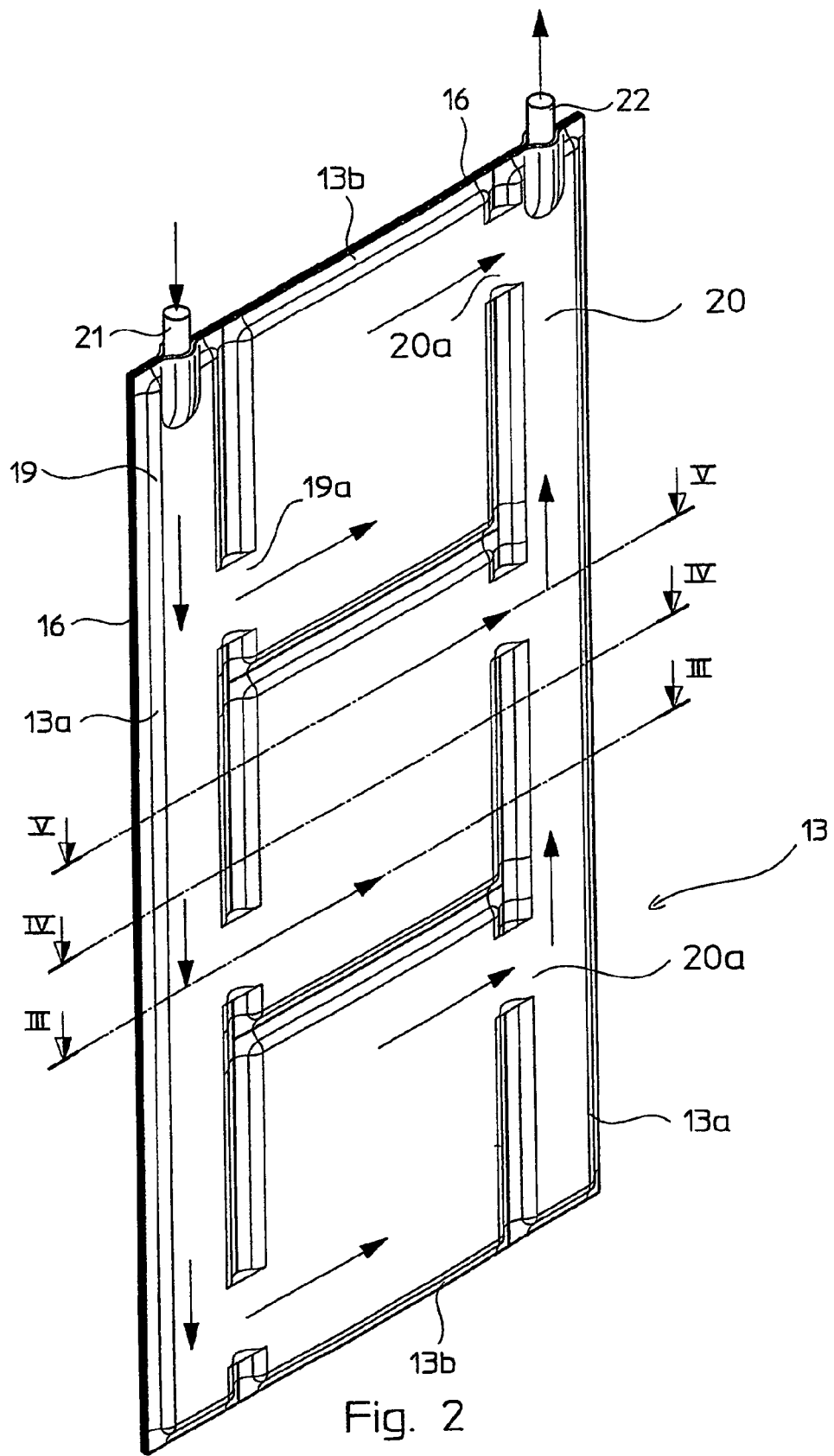
FIG. 2 represents on an enlarged scale a heat exchanger of the heat exchange unit of FIG. 1.
Figure 3:
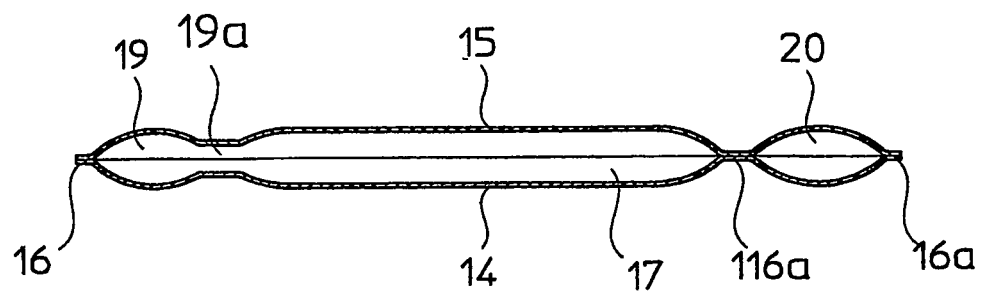
FIGS. 3, 4 and 5 are section views along lines III—III, IV—IV and V—V of FIG. 2, respectively.
Figure 4:
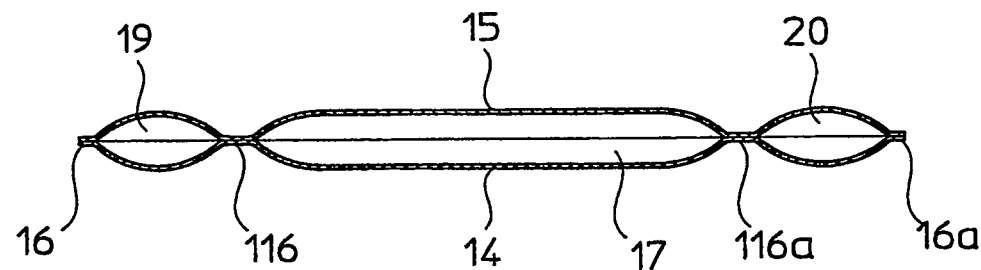
Figure 5:
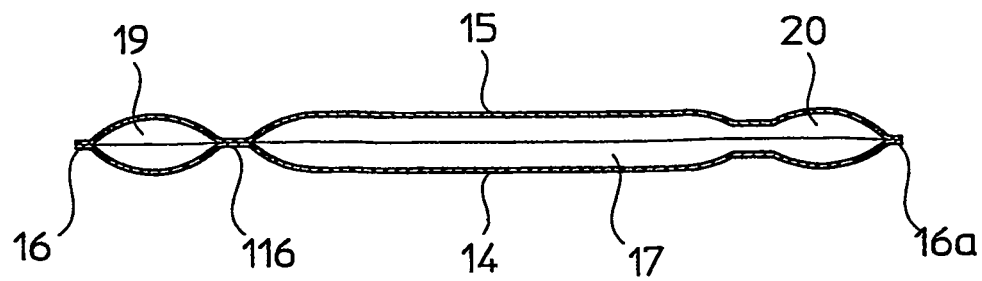

In particular, according to a preferred but not limiting embodiment, outlined in FIG. 1, said heat exchange unit 12 comprises a plurality of heat exchangers 13, regularly distributed in three coaxial and concentric arrays. Each exchanger 13 (FIG. 2) has a substantially box-like structure, with an essentially elongated, flattened rectangle configuration, in which two opposite long sides 13a and two opposite short sides 13b are outlined.

In the aforementioned heat exchange unit 12, the exchangers 13 are in a substantially radial arrangement, with long sides 13a parallel to the axis of said unit 12 (and therefore to the axis of the shell 2 of said reactor 1), and short sides 13b extending radially, and are organised to constitute a plurality of radial sets of three exchangers.

Of course, according to different technical and implementing requirements, each set of three exchangers 13 can be replaced with a pair of exchangers or by one single exchanger, which occupies the entire radial extension of the basket 7.

Even more particularly (FIGS. from 2 to 5) each exchanger 13 is made of a pair of juxtaposed metallic sheets 14, 15, mutually joined at a predetermined distance by perimetric soldering 16, 16a, so that between them a chamber 17 is defined, intended to be crossed by an operating heat exchange fluid.

For an optimal heat exchange efficiency with the reactant gases and with the gaseous reaction products which cross the catalytic bed in the radial direction, the heat exchange fluid must in turn cross each exchanger 13 of the exchange unit 12 in a radial or substantially radial direction, in co-current or in countercurrent to said gases.

For such a purpose and in accordance with a characteristic of the present invention, each exchanger 13 is 9 equipped at opposite long sides 13a, with a distribution pipe 19 and a collection pipe 20, respectively, for said operating fluid. The pipes 19 and 20 are, on one side, in fluid communication with said chamber 17 through at least one, but preferably a plurality of openings or holes 19a and 20a, with which they are equipped along one or more generatrix and, on the other side, with the outside of the exchanger 13, through fittings 21 and 22, for the inlet and outlet of said operating fluid, respectively.

According to a first preferred embodiment, said pipes 19 and 20 are "formed" directly in the long sides 13a of the exchanger 13, at the moment of the drawing and perimetric soldering of the metallic sheets 14 and 15 which mike it up. Advantageously, they are obtained through welding seams 116, 116a, extending parallel to the perimetric soldering 16 and 16a, at a predetermined distance from them, whereas the openings 19a, 20a for the passage of fluid are obtained through appropriate interruptions of such welding seams 116, 116a.

According to another embodiment (not represented) said pipes 19 and 20 are made of respective tubes, fixed in said chamber 17, at the long sides 13a, of the exchanger and parallel to them and form a whole with the respective fittings 21 and 22, quoted above.

In accordance with another characteristic of the present invention, the fittings 21 and 22 of the pipes 19 and 20, for distributing and collecting the operating fluid into and from each exchanger 13, respectively, are arranged at a same short side 13b of the exchanger.

When arranged to constitute said heat exchange unit 12 of the present invention, in the arrangement described above (FIG. 1), the short side 13b, with corresponding fittings 21 and 22, constitutes the upper side of every exchanger 13, whereas the opposite short side is directly fixed, in a per se known way, to a support structure (not represented) of the entire heat exchange unit 12.

Figure 6:
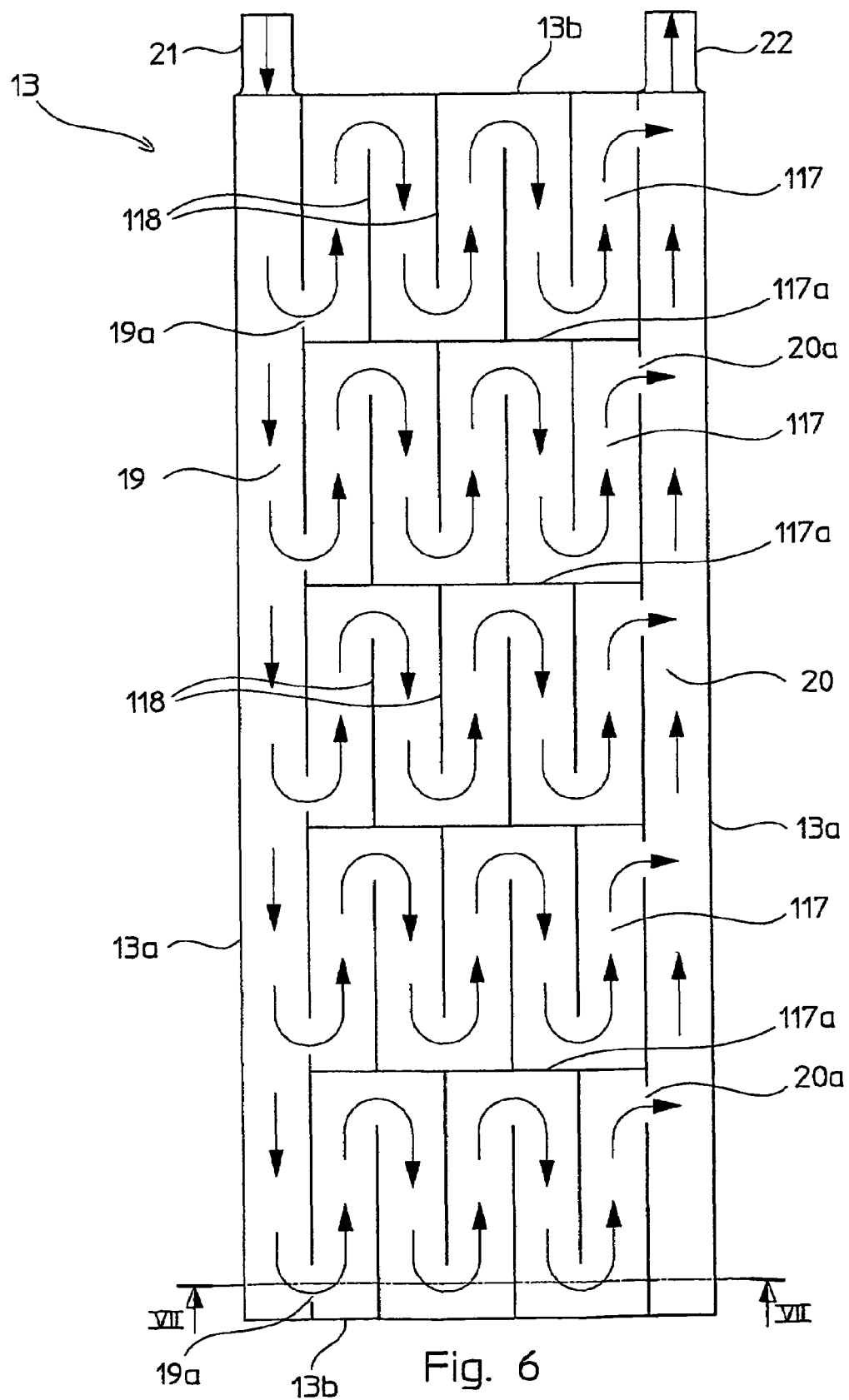
FIG. 6 schematically represents a preferred configuration of the heat exchanger of FIG. 2.
Figure 7:
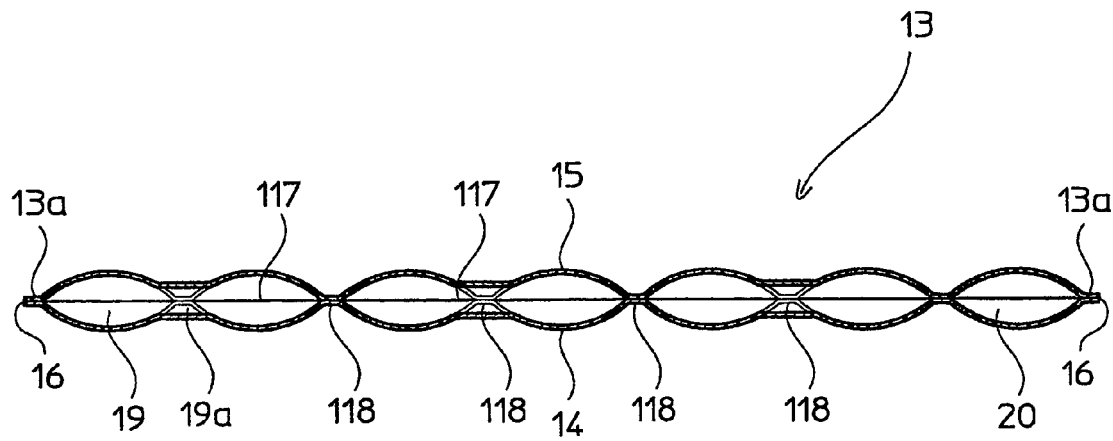
FIG. 7 represents a section view along line VII—VII of FIG. 6.

Advantageously, for greater heat exchange efficiency, at least part of the exchangers 13, of the entire exchange unit 12, are manufactured according to the configuration schematically illustrated in FIG. 6.

According to this alternative embodiment, the inner chamber of each exchanger 13 is subdivided into a plurality of chambers 117, not directly communicating with each other and obtained, for example, through a corresponding plurality of welding seams 117a of the metallic sheets 14, 15, extending parallel to the short sides 13b of the exchanger 13, in other words perpendicular to its distributor 19 and collector 20 pipes. Said chambers 117, which can either all have the same width or have different widths depending on requirements, are internally equipped with a plurality of deflector baffles 118, extending parallel to said pipes 19, 20 and which define in each chamber 117, a substantially serpentine fluid path.

Each chamber 117 is in fluid communication with said distributor pipe 19, through at least one opening 19a thereof and with said collector pipe 20, through at least one opening 20a thereof.

It should be noted that, for a better control of the pressure drop, and therefore of the distribution of the operating fluid inside the chambers 117, the openings 19a of the distributor pipe 19, are provided near the bottom of each of said chambers 117, and with a different width or light, in particular with an increasing width in the flow direction of the operating fluid inside said pipe 19.

Figure 9:
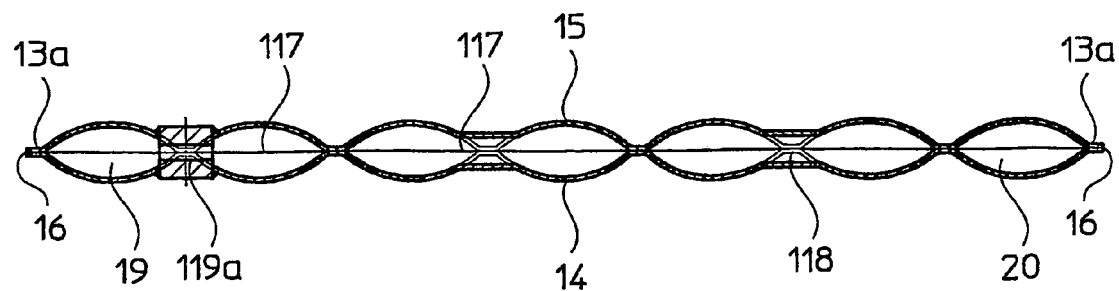
FIG. 9 represents on an enlarged scale a section along line IX—IX of FIG. 8.
Figure 8:
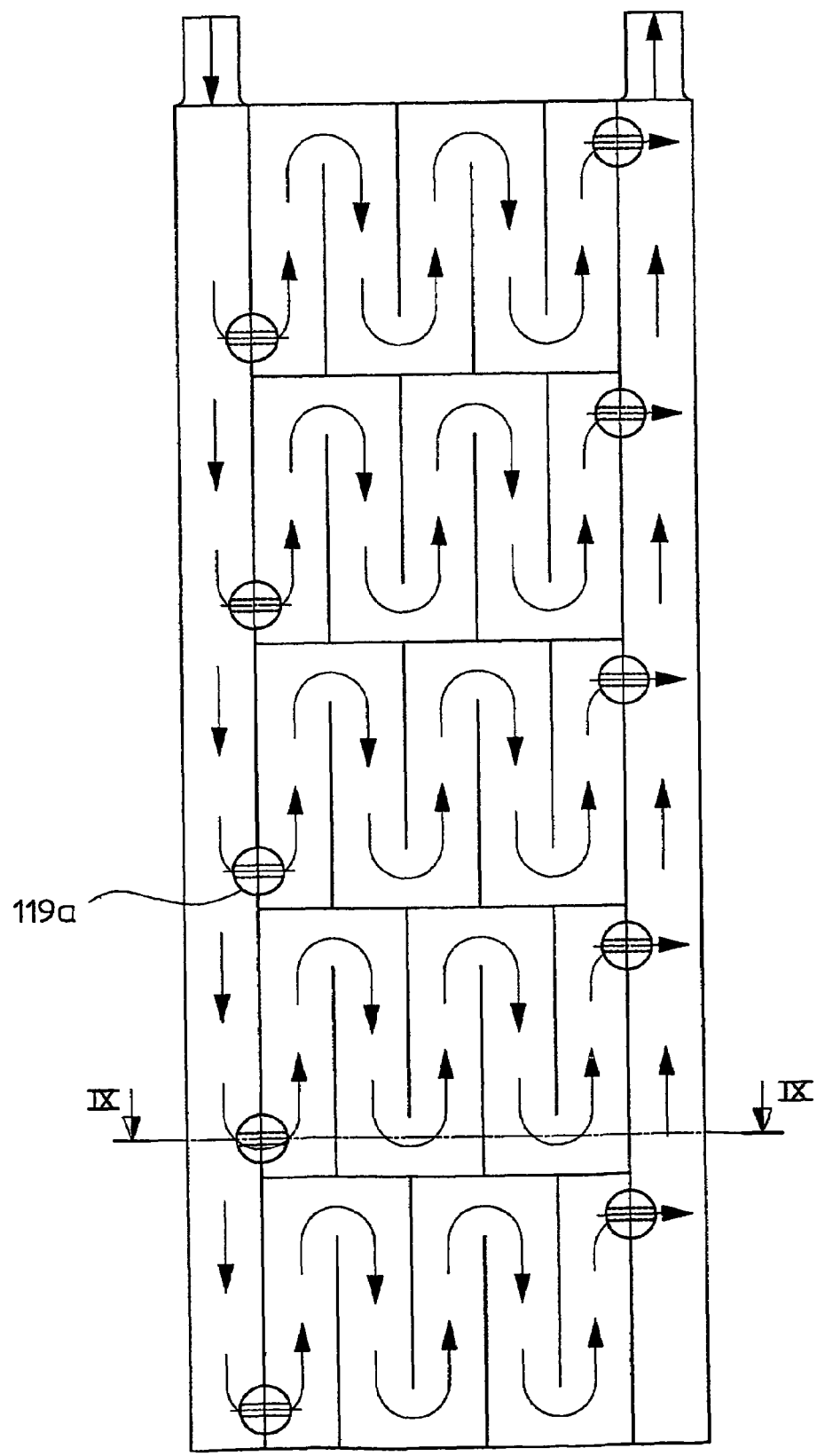
FIG. 8 represents an alternative embodiment of the heat exchanger of FIG. 6.

Advantageously, to increase the aforementioned possibility of controlling the distribution of the operating fluid in the chambers 117, when the pressure drop therein is too low to guarantee it, the use of calibrated sleeves 119a (FIGS. 8 and 9) are foreseen, appropriately inserted in each of said openings 19a, so as to obtain precise and calculated fluid-passage sections (and thus precise and calculated pressure drop).

In the isothermal reactor 1 of the present invention, at the upper end of the catalytic basket 7 and in a position overlying the heat exchange unit 12, an annular pipe 23 is foreseen for the general distribution of the operating fluid.

When the operating fluid consists of the reactant gases themselves (FIG. 1), and must cross the heat exchange unit 12 in co-current with the gaseous reaction products, such a pipe 23 is in fluid communication with the outside of the isothermal reactor 1, through a respective feeding pipe 23a of said fluid, connected to an inlet passage 5a of said reactant gases in the reactor itself. On the other side, said pipe 23 is in fluid communication with the plurality of distributor pipes 19, of the outermost exchangers 13 in each radial set of three exchangers.

Moreover, in each of said radial sets of three, the collector pipes 20 of each exchanger are directly connected with the distributor pipes 19 of the exchanger which immediately follows it towards the axis of the shell 2. Such a connection can be carried out by putting the collector fittings 22 of, an exchanger in fluid communication with the distributor fittings 21 of the subsequent exchanger, in a sort of head-to-tail hydraulic connection, as shown in the attached drawings.

The collector pipes 20 of the more inner exchangers 13 of the heat exchange unit 12, are "open" in the upper part of the shell 2 (substantially at the upper bottom 4), so that the reactant gases preheated or cooled in the exchangers 13 can be conveyed to the space 9 and from there to the catalytic bed contained in the basket 17 which is crossed in a radial direction.

With the arrangement described above it is possible to achieve a further important advantage. Indeed, in the same zone occupied by the annular distributor pipe 23, it is possible to arrange another two (or more) annular pipes 24, 25, for the distribution of the predetermined operating heat exchange fluid (in particular and advantageously consisting of reactant gases), each of which is in fluid communication with the heat exchangers 13 of a respective annular array of exchangers. For example and preferably, such a connection is provided at the head-to-tail hydraulic connections between exchangers 13 of a same radial set of three exchangers.

With 24a and 25a are indicated feeding pipes of said operating fluid from the outside of the reactor to the annular pipes 24 and 25, respectively.

In this way, it is possible to introduce "fresh" operating fluid into the exchangers 13 of the intermediate annular arrays and therefore it is possible to control the temperature profile in the catalytic bed.

Figure 10:
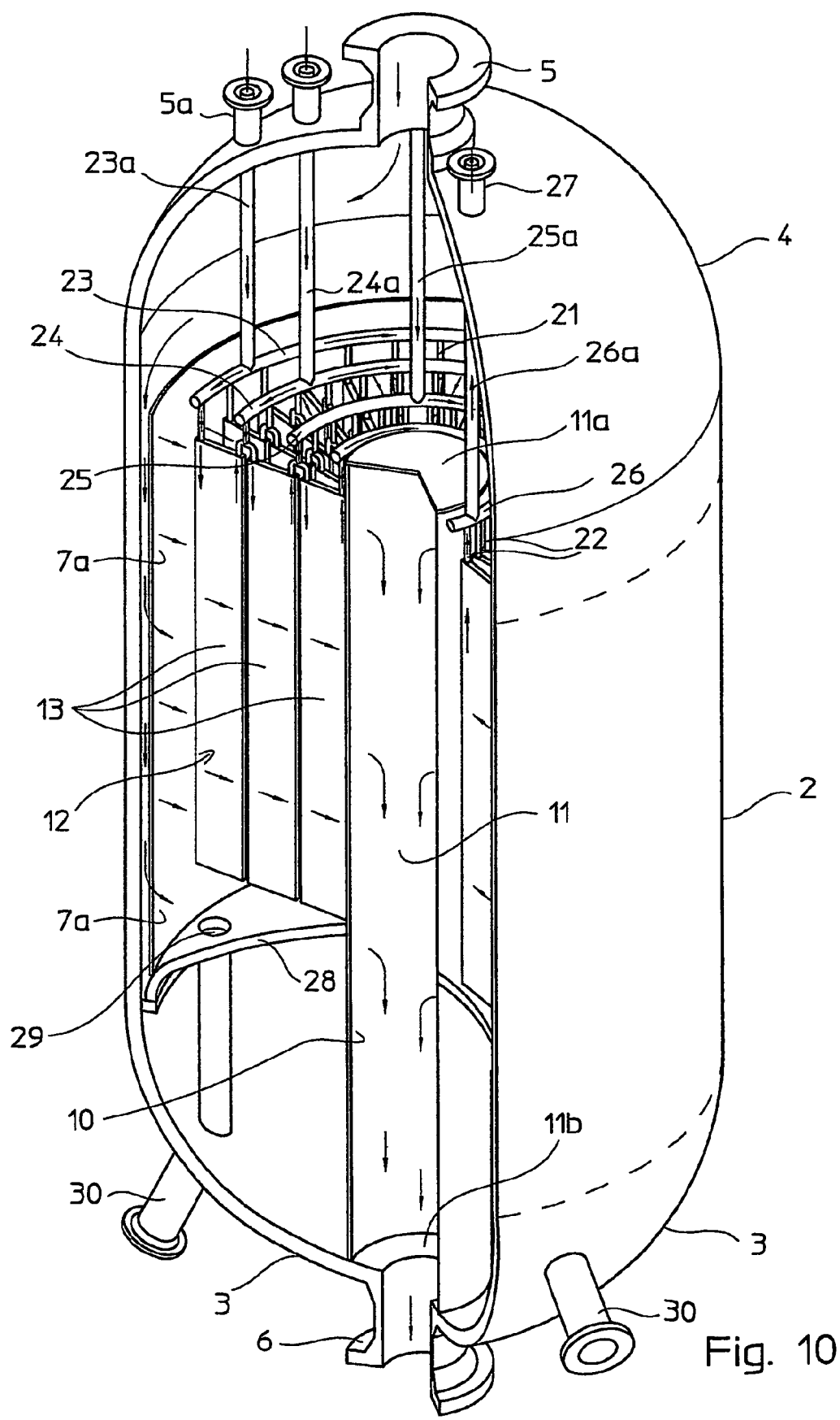
FIG. 10 represents an alternative embodiment of the radial isothermal reactor of FIG. 1.

In FIG. 10 an alternative embodiment of the isothermal reactor of the present invention is represented, particularly, even if not exclusively, suitable when the operating fluid to-be used is water, or else reactant gases to be preheated (or cooled), but to be made to react in another reactor. In this figure, all of the details already described in FIG. 1 are defined with the same reference numbers.

According to this alternative, in the zone which is (possibly) occupied by the annular pipes 23, 24 and 25, for the distribution of the operating heat exchange fluid, a final annular pipe 26 (collector pipe), is arranged to collect said operating fluid which is discharged from the heat exchange unit of the present invention. For such a purpose, the annular pipe 26 is in fluid communication, on one side, with all of the collector pipes 20 through the fitting 22 of the innermost heat exchangers 13 of said unit 12 and, on the other side, through a pipe 26a, with an "outlet" nozzle 27 from the isothermal reactor. The reactant gases are introduced into the reactor 1 through the upper passage 5, provided therein.

For the purpose of discharging the catalyst without removing the plate-shaped exchangers 13, the basket 7 of the chemical reactor of the present invention is equipped with a bottom wall 28, which is convex towards the inside of the basket itself. In turn, this bottom wall 28 is equipped, near to the outer wall of said basket 7, with a plurality of openings 29 (in FIG. 10 only one opening can be seen), in communication with respective nozzles 30 for the discharge of catalyst, provided in the bottom 3 of said reactor.

The invention thus conceived is susceptible to further variants and modifications all falling within the skill of the man skilled in the art and, as such, falling within the scope of protection of the invention itself, as it is defined by the following claims.

The invention claimed is:

1. A heat exchange unit for isothermal radial or axial-radial chemical reactors, with an overall configuration which is substantially annular and cylindrical having a passage with a predetermined diameter running through it axially, comprising:
    a plurality of substantially rectangular, flattened box-shaped heat exchangers, distributed in a plurality of coaxial and concentric arrays, defining in said unit a plurality of radial alignments with a substantially radial arrangement, wherein said exchangers have long sides parallel to the axis of said unit and short sides extending radially,
    wherein each of said exchangers comprises an inner chamber, intended to be passed through by an operating heat exchange fluid, at least one distributor pipe and at least one collector pipe of said operating fluid, associated with two respective opposing sides of said exchanger and extending along them, said pipes being in fluid communication, on the one side, with said chamber through at least one opening formed therein and, on the other side, with the outside of said exchanger, through respective inlet and outlet fittings for said operating fluid.

2. Heat exchange unit according to claim 1, wherein each of said exchangers is made of a pair of juxtaposed metallic sheets mutually joined at a predetermined distance by perimetric soldering so that between them said chamber is defined.

3. Heat exchange unit according to claim 2, wherein said pipes for distributing and collecting the operating fluid, respectively, are arranged at opposed long sides of a respective exchanger.

4. Heat exchange unit according to claim 3, wherein said pipes consist of respective tubes, fixed in said chamber at said opposite long sides of the respective exchanger.

5. Heat exchange unit according to claim 3, wherein said pipes are directly formed at said long sides while forming the exchanger.

6. Heat exchange unit according to claim 4, wherein said pipes are in fluid communication with the outside of the exchanger through respective tubular fittings, placed on a same short side of the exchanger itself and facing the same part of said unit.

7. Heat exchange unit according to claim 4, wherein said pipes are in fluid communication with said chamber through respective plurality of openings, formed in said pipes along generatrix thereof.

8. Heat exchange unit according to claim 1, wherein in said radial arrangement and in each radial alignment of heat exchangers, each exchanger has the said respective fitting for the outlet of the operating fluid, in fluid communication with the fitting for the fluid inlet of the exchanger adjacent in the same radial alignment, through a substantially head-to-tail hydraulic connection.

9. Heat exchange unit according to claim 1, wherein said chamber is subdivided in a plurality of chambers that do not communicate with each other directly, each of which is in fluid communication with said distribution pipe and with said collector pipe, through respective openings formed therein.

10. Heat exchange unit according to claim 9, wherein said chambers are obtained through welding seams of said metallic sheets extending perpendicularly to said pipes.

11. Heat exchange unit according to claim 10, wherein each of said chambers is internally equipped with a plurality of deflector baffles, extending parallel to said pipes and which define a substantially serpentine path for said operating fluid.

12. Heat exchange unit according to claim 11, wherein said chambers have the same width.

13. Heat exchange unit according to claim 7, wherein said openings of said distribution pipe are of different width.

14. Heat exchange unit according to claim 12, wherein said openings are of increasing width or light in the direction of the flow of said operating fluid inside distribution pipe.

15. Heat exchange unit according to claim 12, wherein in each of said openings a calibrated sleeve is fitted, in order to obtain fluid-passage sections of predetermined dimensions between said distribution pipe and each of said chambers.

16. Heat exchange unit according to claim 1, wherein it comprises at least an annular pipe for the general distribution of said operating fluid, in communication, on one side, with the distribution pipes of the outermost exchangers of said unit and, on the other side, with a respective pipe for feeding the operating fluid into said reactor.

17. Heat exchange unit according to claim 16, wherein it comprises at least a further annular pipe for the inlet of operating fluid, in communication, on one side, with the head-to-tail hydraulic connections of each radial alignment of exchangers and, on the other side, with a respective pipe for feeding said operating fluid into said reactor.

18. Heat exchange unit according to claim 17, wherein said collecting pipes of the innermost heat exchangers of said unit are singularly open towards the outside of said unit at a same side thereof.

19. Heat exchange unit according to claim 17, wherein it comprises a further annular pipe for the general collection of the operating fluid discharged from said unit, which is connected to all said collecting pipes of the innermost heat exchangers of said unit.

20. Isothermal chemical reactor comprising a cylindrical shell, a catalytic basket, supported in said shell and having cylindrical and coaxial outer and inner walls, respectively, and a bottom wall, wherein it comprises a heat exchange unit according to claim 16, supported in said basket.

21. Reactor according to claim 20, wherein said bottom wall is convex towards the inside of said basket.

22. Reactor according to claim 21, wherein said convex bottom is equipped with at least one opening for the discharge of catalyst, formed in proximity of the outer wall of said basket and in communication with the outside of said reactor.

* * * * *